Patented July 28, 1942

2,291,399

UNITED STATES PATENT OFFICE 2,291,399

SOLDER FLUX

Mike A. Miller, New Kensington, Pa., assignor to Aluminum Company of America, Pittsburgh, Pa., a corporation of Pennsylvania No Drawing. Original application December 29, 1939, Serial No. 311,599, now Patent No. 2,266,060, dated December 16, 1941. Divided and this application March 13, 1941, Serial No. 383,171

8 Claims. (Cl. 148—23)

This invention relates to a solder flux which is useful for the soft soldering of metals. This application is a division of my copending application Serial No. 311,599, filed December 29, 1939, which issued December 16, 1941, as U. S. Pat. No. 2,266,060. The flux compositions disclosed but not claimed herein are claimed in my above-mentioned copending application and copending applications Serial Nos. 383,172 and 383,173, filed March 13, 1941.

The soldering art is classified into hard or soft soldering, depending on whether a high or low melting point solder is employed. Generally, soft soldering is done with solders which melt below 700° F., whereas the solders used for hard soldering melt at about 1300° F. or higher, according to the 1939 edition of the American Society for Metals handbook, page 1205. In order to obtain a good contact between the solder and metal being joined, it is necessary to use a flux for preparing the metal surface that will attack said surface at a temperature below the melting point of the solder. In the case of low melting point solders, a problem arises in securing satisfactory low melting point fluxes. While some salt fluxes meet the requirement of having a low melting point, they are undesirable from the standpoint of leaving a residue which, if not removed, promotes corrosion of the soldered joint. To overcome this disadvantage, it has been proposed that non-corrosive organic compounds be employed, but these are often too sluggish in their action on the metal to be commercially useful. They also have little or no effect upon the spreading of the molten solder, which is a highly desirable characteristic in a flux. This condition has been met in part by combining a hydrohalide acid with an organic compound. When such an addition compound is heated, the acid component is released and attacks the metal. This action of the acid may be too severe and cause an unnecessary pitting or localized attack on the metal surface, with a resultant non-uniform bonding of the solder to the metal. Furthermore, some acid components are exceedingly irritating to the operator, if not actually poisonous, and hence must be used with considerable care.

It is an object of my invention to provide an organic flux suitable for use in the soft soldering of metals that is non-corrosive when left in contact with the metal being soldered, and yet which mildly but uniformly attacks the metal surface during the soldering operation. Another object is to provide a flux that is easy to handle. Still another object is to provide a low melting point flux which promotes the spreading of the molten solder. These and other objects will become apparent from the following description of my invention.

My invention is based upon the discovery that when boron trifluoride is combined with a certain group of organic compounds a very satisfactory soft soldering flux is obtained. More particularly, I have found that boron trifluoride in combination with unmodified alcohols, alcohol-ethers, cyclic ethers, ketones, organic esters, organic acids, amides, and aliphatic, aromatic, and heterocyclic mono-amines provides a very desirable flux for soft soldering of copper, iron, and other metals. Although the nature of the association between the organic compound and boron trifluoride is not accurately known in all cases, it nevertheless appears that some kind of compound is frequently formed which may be referred to as an addition compound. Whether or not a compound exists, I have found that the addition of boron trifluoride to the above named classes of organic compounds greatly enhances the fluxing characteristics of the compound, and in some cases it may even impart these characteristics to a compound which is otherwise useless as a flux. The presence of boron trifluoride along with the aforesaid organic compounds causes the flux to uniformly attack the metal being soldered without localized pitting and resultant unsoundness in the soldered joint. These compounds containing boron trifluoride act at a sufficiently low temperature to permit use with any of the usual soft solders. Furthermore, these flux compounds promote the spread of the molten solder.

The organic compounds which I have found to be useful for making fluxes, as mentioned hereinabove, are unmodified alcohols, alcohol-ethers, cyclic ethers, ketones, organic acids, organic esters, amides, and aliphatic, aromatic, and heterocyclic mono-amines. By the term "unmodified alcohol" I mean those monohydric and polyhydric alcohols which contain no other elements than carbon, hydrogen, and oxygen; for example, octyl alcohol, ethylene glycol, glycerin, etc., and are not associated with ethers. The alcohol-ethers are compounds which contain both alcohol and ether groups, such, for example, as ethylene glycol mono-methyl ether and diethylene glycol mono-butyl ether. Amino alcohols, which are excluded from the foregoing group but which form useful fluxes when combined with boron trifluoride, are described and claimed in my copending United States application Serial No. 306,887. Likewise the polyamines are excluded from the above named classes of mono-amines, the former being described and claimed in my copending United States application Serial No. 306,888. The mono-amines, as the expression implies, are compounds which contain but one amine group. Compounds of the classes named above which have been successfully used for soft solder fluxing in combination with boron trifluoride are: glycerin, ethylene, diethylene, triethylene and tetraethylene glycols, 1-3 butylene glycol, propylene glycol, dimethoxy tetraethylene glycol, dipropylene glycol, ethylene glycol mono-methyl ether, ethylene glycol mono-ethyl ether, ethylene glycol mono-isopropyl ether, ethylene glycol mono-butyl ether, also the diethylene glycol compounds with the same alkyl ethers, ethylene glycol mono-benzyl ether, ethylene glycol mono-phenyl ether, maleic, gluconic, oleic, citric, tartaric, benzoic, and salicylic acids, acetone, dioxane, diglycol oleate, pyridine, quinoline, morpholine, castor oil, mono-, di-, and tri-amyl amines, aniline, ortho-toluidine, and acetamide. Numerous equivalents of the foregoing compounds will suggest themselves to one skilled in the art. Of the foregoing compounds, I prefer those belonging to the alcohol, the alcohol-ether and amine classes. When treated with boron trifluoride, the resultant products range in physical form from limpid liquids to solids, depending on the compound and the amount of boron trifluoride added, and hence are adapted to a wide variety of applications. Moreover, they may be mixed with conventional vehicles, plasticizers, or other diluents to obtain any desired consistency.

The boron trifluoride combinations with the foregoing organic compounds may constitute the entire flux or only a part of it, depending upon the physical characteristics desired. A useful range within which they may be employed lies between 1 and 100 per cent of the boron trifluoride addition compound, where a compound is formed. Although reference has been made to the use of a single compound, it is advantageous at times to employ two or more organic substances in combination with boron trifluoride. Where two or more of these substances are used, the minimum amount of each substance should not be less than about 0.5 per cent of the flux.

The boron trifluoride may combine with the organic compounds in equi-molecular or multi-molecular proportions, when the compounds are saturated with boron trifluoride, that is, one or more molecules of the trifluoride may be added per molecule of the organic compound, or there may be one molecule of the trifluoride for two or more molecules of the organic compound, depending on the character of the substance. In cases where compounds are not formed or cannot be readily identified, the trifluoride is introduced until a certain increase in weight is obtained. Also, in some cases where compounds are formed, it is most advantageous to add a certain amount of the trifluoride to the organic compound or mixture of compounds, and not attempt to saturate them with the trifluoride so to speak, and thus provide an excess of the organic compound over and above that united with the boron trifluoride. In such instances the proportion of the trifluoride organic compound to the uncombined organic material preferably lies between 50 and 75 per cent of the total weight of the flux. In both cases, either where a compound is formed or where one is not formed, the boron trifluoride concentration may be conveniently expressed in terms of the weight of the organic substance; that is, the trifluoride represents a certain percentage by weight with respect to the total weight of trifluoride plus the organic compound. In general, the trifluoride should represent about 0.5 to 50 per cent of the weight of the final mixture of the trifluoride and the organic compound.

Fluxes composed entirely of such mixtures without a vehicle or plasticizer are very satisfactory and using them in this form eliminates the step of adding a vehicle or other diluting substance and the attendant mixing operation. Where the flux consists of a boron trifluoride addition compound, it should melt below and have a boiling point above the fusing temperature of the solder being used.

The fluxes herein described can be used with a variety of soft solders. However, in the soldering of a particular metal, it is usually desirable to select a solder which will not promote electrolytic corrosion between itself and the metal to which it is joined.

Some examples will serve to illustrate the increase in the spread of the solder brought about through use of the fluxes described above. In these tests a comparison was made between the fluxing property of the organic compound before and after treatment with boron trifluoride. Two commercial zinc chloride fluxes, a 5 per cent zinc chloride solution and a zinc chloride-vaseline paste, and rosin, were also included to afford standards of comparison by which to judge the spreading power of the new fluxes. The test consisted of placing a 0.3 gram pellet of 50-50 lead-tin solder on a piece of copper or iron sheet about 1 inch square together with about 2 drops of the flux material or the equivalent of 2 drops where the material was solid. The fluxes used are listed in the table below. To show the oxide film penetrating power of the fluxes, some of the copper samples were oxidized and tested with the zinc chloride paste, rosin, and ethylene glycol mono-isopropyl ether boron trifluoride fluxes. The pieces of sheet with solder and flux placed thereon were then heated on a hot plate until the solder melted and spread out as far as it would go. Upon removal from the hot plate the approximate diameter of the area covered by the solder was measured. The data so obtained is given in the table below. In every instance the organic flux contained no vehicle, plasticizer, or other diluent.

*Solder spread tests with BF$_3$—organic compounds*

| Compound | Type | Metal soldered | Diameter of area in inches covered by solder | |
|---|---|---|---|---|
| | | | Original compound | Compound with BF$_3$ |
| Ethylene glycol | Alcohol | Copper | 0.12 | 0.47 |
| | | Iron | 0.0 | 0.32 |
| Ethylene glycol monoisopropyl ether | Alcohol-ether | Copper | 0.0 | 0.50 |
| | | Iron | 0.0 | 0.32 |
| Acetone | Ketone | Copper | 0.0 | 0.50 |
| Diglycol oleate | Organic ester | do | 0.20 | 0.30 |
| Salicylic acid | Acid | Copper | 0.39 | 0.55 |
| | | Iron | 0.32 | 0.32 |
| Acetamide | Amide | Copper | 0.0 | 0.50 |
| | | Iron | 0.0 | 0.47 |
| Mono-amyl amine | Alipathic amine | Copper | 0.0 | 0.47 |
| | | Iron | 0.0 | 0.12 |
| Morpholine | Heterocyclic amine | Copper | 0.0 | 0.32 |
| Aniline | Aromatic amine | do | 0.0 | 0.30 |
| Com'l. ZnCl$_2$ flux solution | | Copper | 0.55 | |
| | | Iron | 0.55 | |
| Com'l. ZnCl$_2$ paste flux | | Copper | 0.39 | |
| | | Iron | 0.35 | |
| Rosin | | Copper | 0.23 | |
| | | Iron | 0.08 | |
| ZnCl$_2$ paste | | Oxidized copper | 0.47 | |
| Rosin | | do | 0.0 | |
| Ethylene glycol monoisopropyl ether | Alcohol-ether | do | | 0.47 |

It will be observed that in every instance the addition of boron trifluoride to the organic compound has improved the solder spreading power of the flux, and in some instances, the trifluoride has actually imparted this property to the organic compound. Although the zinc chloride flux compares favorably with the trifluoride fluxes in causing the solder to spread, it suffers from the important disadvantage of leaving a residue which is hygroscopic and therefore, upon being exposed to the air for only a few minutes, moisture is absorbed and corrosive attack of the solder and base metal begins immediately. In contrast to such behavior, I have found that the trifluoride fluxes either leave no residue, or if any is left, it is non-hygroscopic and substantially non-corrosive. The tests on the oxidized copper samples show that rosin cannot be used under unfavorable metal surface conditions, even though rosin residues may be non-corrosive.

I claim:

1. A soft soldering flux composition containing a reaction product of boron trifluoride and at least one substance from the group consisting of organic acids and organic esters, said flux being characterized by its ability to uniformly attack a copper surface during a soldering operation and to leave no corrosive residue.

2. A soft soldering flux composition containing from 1 to 100 per cent of boron trifluoride addition compound of at least one substance selected from the group consisting of organic acids and organic esters, said flux being characterized by its ability to uniformly attack a copper surface during a soldering operation and to leave no corrosive residue.

3. A flux composition consisting of a boron trifluoride addition compound of at least one of the substances selected from the group consisting of organic acids and organic esters, and an excess of said substance with which the boron trifluoride is not united.

4. A flux composition consisting of 50 to 75 per cent of a boron trifluoride addition compound of at least one substance selected from the group consisting of organic acids and organic esters, and an excess of said organic substance with which the boron trifluoride is not united.

5. A soft soldering flux composition containing a reaction product of boron trifluoride and at least one substance selected from the group consisting of organic acids and organic esters in an amount of 0.5 to 50 per cent of the entire weight of the flux, said flux being characterized by its ability to uniformly attack a copper surface during a soldering operation and to leave no corrosive residue.

6. A soft soldering flux composition containing a boron trifluoride addition compound of an organic acid, said flux being characterized by its ability to uniformly attack a copper surface during a soldering operation and to leave no corrosive residue.

7. A soft soldering flux composition containing a boron trifluoride addition compound of an organic ester, said flux being characterized by its ability to uniformly attack a copper surface during a soldering operation and to leave no corrosive residue.

8. A method of soft soldering comprising applying a flux to the metal surface to be soldered, said flux containing a reaction product of boron trifluoride and a substance selected from the group consisting of organic acids and organic esters, said flux being characterized by its ability to uniformly attack a copper surface during a soldering operation and to leave no corrosive residue, and bringing molten solder into contact with the fluxed metal surface.

MIKE A. MILLER.